United States Patent
Wake et al.

(10) Patent No.: US 7,313,415 B2
(45) Date of Patent: Dec. 25, 2007

(54) COMMUNICATIONS SYSTEM AND METHOD

(75) Inventors: David Wake, Ipswich (GB); Keith Beacham, Saxmundham (GB)

(73) Assignee: NEXTG Networks, Inc., Milpitas, CA (US)

(*) Notice: Subject to any disclaimer, the term of this patent is extended or adjusted under 35 U.S.C. 154(b) by 121 days.

(21) Appl. No.: 10/978,501

(22) Filed: Nov. 1, 2004

(65) Prior Publication Data

US 2006/0094470 A1    May 4, 2006

(51) Int. Cl.
*H04B 1/38* (2006.01)
(52) U.S. Cl. .................................. 455/561; 455/560
(58) Field of Classification Search ...... 455/560–562.1, 455/15, 276.1, 7; 379/55.1–56.3
See application file for complete search history.

(56) References Cited

U.S. PATENT DOCUMENTS

| | | | | |
|---|---|---|---|---|
| 5,559,866 | A * | 9/1996 | O'Neill | 455/447 |
| 5,623,495 | A * | 4/1997 | Eng et al. | 370/397 |
| 5,682,256 | A | 10/1997 | Motley et al. | |
| 5,890,055 | A | 3/1999 | Chu et al. | |
| 6,785,558 | B1 * | 8/2004 | Stratford et al. | 455/561 |
| 2001/0036843 | A1 * | 11/2001 | Thompson | 455/562 |
| 2004/0110469 | A1 * | 6/2004 | Judd et al. | 455/15 |
| 2005/0143091 | A1 * | 6/2005 | Shapira et al. | 455/456.1 |

OTHER PUBLICATIONS

Wake, David et al., "Radio Over Fibre Networks For Mobile Communications", Proc. SPIE, vol. 5466, 2004.

* cited by examiner

*Primary Examiner*—Edward F. Urban
*Assistant Examiner*—Raymond S. Dean
(74) *Attorney, Agent, or Firm*—Vierra Magen Marcus & DeNiro LLP

(57) ABSTRACT

A signal distribution system for distributing signals, such as for outdoor wireless networks, comprises a number of remote hubs, each of which can direct wireless signals to a number of antennas. The antennas are used to provide wireless service to the service users, such as mobile units, within their geographic coverage area. The remote hubs are connected to main hubs, which are usually located centrally. Each main hub can support a number of remote hubs. The main hubs are connected to a number of base stations (again usually located centrally) in a flexible and re-configurable manner using a switch matrix. Some remote hubs may also include switched matrices for a further level of signal routing.

26 Claims, 4 Drawing Sheets

COMMUNICATIONS SYSTEM AND METHOD

BACKGROUND OF THE INVENTION

The present invention relates to a communications system and method and, more particularly, to a signal distribution system and method for switching and connecting cells in a communications network.

The use of a switching matrix for wireless communications systems based on distributed antennas is disclosed by Motley et al. in U.S. Pat. No. 5,682,256. Motley et al. uses a switching matrix to interconnect a number of base stations on the input ports to a number of distributed antennas on the output ports. The switch matrix allows any combination of inputs to be connected to any combination of outputs so that base stations can be connected to antennas in a very flexible manner. This allows wireless services such as cellular radio to be delivered to users with significant cost savings for network operators. The benefits of using a switched distributed antenna system are outlined for example in a paper by Wake and Beacham, "Radio over fiber networks for mobile communications", Proc. SPIE, vol. 5466, 2004.

The links between the switch matrix and the distributed antennas are accomplished in Motley et al. using optical fiber cables using a technique known as radio over fiber. Radio over fiber has many advantages for this type of network with high quality transmission and low signal attenuation as a function of distance being the primary ones. However, there are situations where optical fiber cables are not available at economic cost at places where they are required. An example of this type of situation is a city center where the local telecommunications operator does not provide 'dark' fiber cables, i.e., fiber cables that are not part of a managed service.

Chu et al., in U.S. Pat. No. 5,890,055, discloses the use of wireless repeaters in a distributed antenna system (DAS) with a fixed configuration. This architecture avoids the problems of fiber availability described above. However, the fixed configuration described by Chu limits the operational benefits of a switched approach.

BRIEF SUMMARY OF THE INVENTION

The present invention provides system architecture that gives the operational benefits of a switched-DAS, without the problems caused by fiber availability, by describing a network containing switched wireless links. Furthermore, the present invention describes a system architecture that incorporates distributed switching within remote hubs in order to provide fine granularity in allocating services to antennas.

One embodiment of the present invention is directed to a transmission system for distributing signals for outdoor wireless networks. The transmission system comprises a number of remote hubs, each of which can direct wireless signals to a number of antennas. The antennas are used to provide wireless service to the service users, such as mobile units, within their geographic coverage area. The remote hubs are connected to main hubs, which are usually located centrally. Each main hub can support a number of remote hubs. The main hubs are connected to a number of base stations (again usually located centrally) in a flexible and re-configurable manner using a switch matrix. The base stations are connected to the core wireless network via digital transmission links.

The base stations are usually grouped together in a convenient central location, sometimes known as a base station hotel. The radio signals from the centrally located base stations are therefore distributed to many remote antennas using an architecture containing main hubs and remote hubs. The switch matrix, under software control, is able to change the network configuration, i.e., to change which signals from which base stations go to which antenna cluster. This is important in many situations, for example, to be able to move network capacity from under-utilized coverage areas to relieve congestion in over-utilized coverage areas. An example of this situation is the sports stadium scenario, where capacity requirements are very low apart from when an event is taking place. The switch matrix would mean that a dedicated base station is not necessary for the sports stadium, leading to a saving in capital equipment cost. There are many other situations where the switch matrix gives both capital and operational cost savings; these are described in Wake and Beacham cited above.

The connections between the main hubs and remote hubs, and between the remote hubs and the antennas are either wireless links or a mixture of wireless links and cabled links. In most cases, the technology of choice for the cabled links will be optical fiber, unless the link lengths are so short that coaxial cable can be used. This may happen for instance if the main hub and one of the remote hubs are co-located. The technology options available for the wireless links include in-band radio, out-of-band radio and free-space optics. In-band radio means that no frequency translation is used, i.e., that the radio carrier frequency is used for transmission. Out-of-band radio means that the transmission frequency is different to that of the radio carrier and is usually at a much higher frequency (possibly millimetre-wave) to take advantage of high antenna gain and high available bandwidth. Free-space optics uses an optical carrier for transmission, and is sometimes preferred to radio because it can be used without an operating license and the available bandwidth is not subject to regulation.

In most cases, the signal that is distributed over the transmission links is likely to be analog (either direct radio carriers or frequency translated radio carriers). However, the present invention does not preclude the transmission of digital signals, whether the signals are baseband or digitized radio (using fast analog to digital converters). Baseband digital signals could for example be those relating to the open base station initiatives (CPRI and OBSAI), where the base stations are split into baseband digital and radio parts and interconnected using digital links. A typical deployment scenario for the present invention may include a mixture of analog, digitized radio and baseband digital links.

The present invention further includes a communications method for distributing signals employing switched wireless links and may further include employing distributed switching in remote hubs.

These and other features and advantages of embodiments of the present invention will be apparent to those skilled in the art from the following detailed description of the embodiments of the invention, when read with the drawings and the appended claims.

DETAILED DESCRIPTION OF THE INVENTION

In the following description of embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

Figure 1:
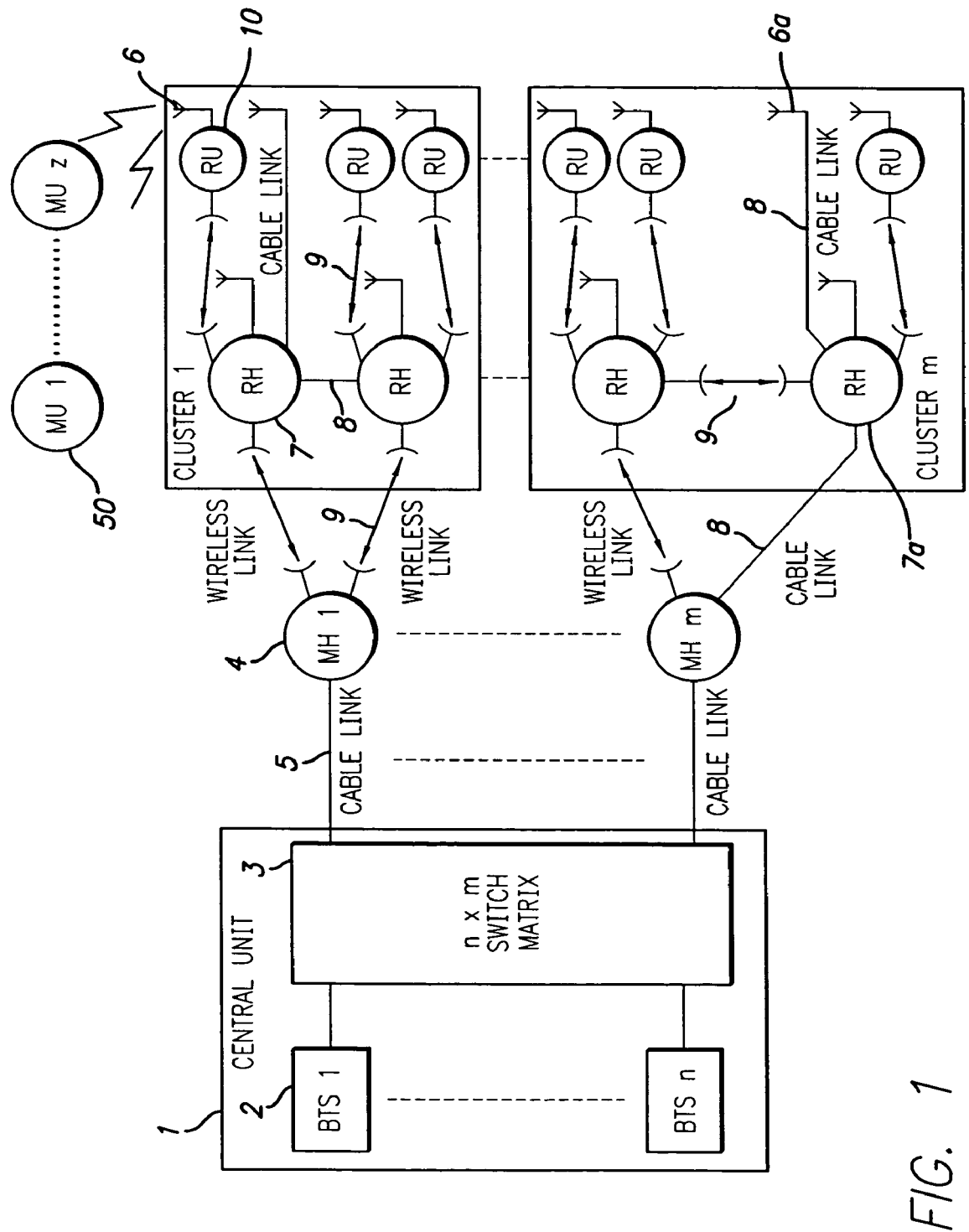
FIG. 1 is a schematic representation of a signal distribution system of the present invention.

FIG. 1 is a schematic representation of a signal distribution system of the present invention. The central unit 1 comprises a number of base stations 2 and a n×m switch matrix 3. The base station output ports are connected to the input ports of the switch matrix. The output ports of the switch matrix are connected to a number of main hubs 4 using cables 5.

In one example, the base stations could be located within an equipment room inside a building and the main hubs could be located on the top of the building. The cables would either be optical fiber or coaxial depending on the distance between the main hubs and base stations. It should be noted the number of cables do not have to equal the number of main hubs as illustrated in FIG. 1. The number of cables may be more or less than the number of hubs. For example, although a cable will typically be used to connect an output port of the switch matrix to a main hub, a wireless link may be used instead.

The main hubs each connect to a cluster of antennas 6 via remote hubs 7. FIG. 1 illustrates the same number m of main hubs and clusters, but the present invention is not so limited. The number of main hubs can be greater or less than the number of clusters. Connections between the main hubs and remote hubs, between the remote hubs and antennas, and between remote hubs are via a mixture of cable links 8 and wireless links 9 as illustrated in FIG. 1. In the case of wireless links, connection to the antennas is made using remote units 10. The antennas transmit and receive signals to and from mobile units or devices such as, without limitation, cellular telephone and PDAs. FIG. 1 illustrates antenna 6 transmitting and receiving signals from a mobile unit or a plurality of mobile units such as mobile unit 50. While FIG. 1 only illustrates mobile units in contact with antenna 6, it is to be understood that other mobile units can be in contact with other antennas illustrated in FIG. 1. It is also to be understood that one or more mobile units may be in contact with more than one antenna.

Remote units are not required for the present invention. The use of remote units is only necessary when the signal needs to be processed before being radiated by the antennas to mobile units. For example, in the case of wireless links, a remote unit 10 functions to convert the transmitted signal to the appropriate form (frequency, power, etc.) for radiation from the antenna 6 to mobile unit 50. On the other hand, remote hub 7a is directly connected to antenna 6a without an intermediary remote unit. Mobile units are thus in direct communication with remote hub 7a through antenna 6a.

The wireless links may use in-band radio, out-of-band radio or free-space optical technology. In-band radio systems are the simplest, in that they transmit the original radio carrier frequency band across the wireless link. This approach may have limitations concerning interference and antenna gain and so out-of-band radio can be used to minimize these problems. In these systems, the original radio carrier frequency band is translated to a different frequency for transmission. Normally the transmission frequency will be much higher than the original radio carrier frequency in order to make use of higher antenna gain and to ensure that adequate transmission bandwidth is available. An alternative approach is to use free-space optical (FSO) systems for the wireless links. FSO has advantages of license-free operation and zero interference with other radio systems.

The wireless signals may be those of a cellular radio system such as PCS or CDMA2000, or those of other wireless networking systems such as public mobile radio, wireless LAN or broadband wireless access. Radio carrier frequencies range from a few hundred MHz to several GHz for these types of systems, but the present invention is not limited to this frequency range.

Figure 2:
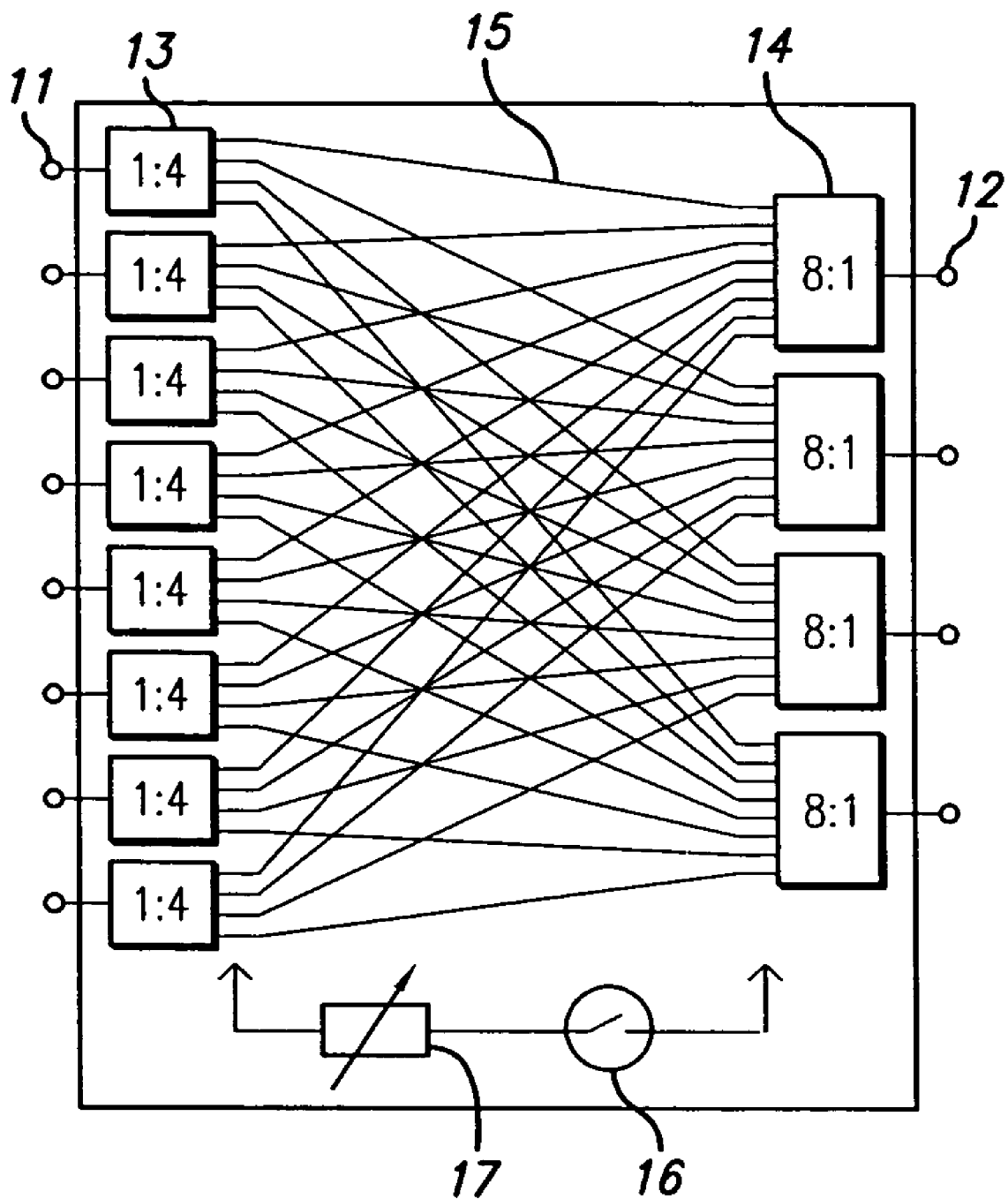
FIG. 2 illustrates a switch matrix to be used in a signal distribution system, such as illustrated in FIGS. 1 and 3.

FIG. 1 illustrates a n×m switch matrix 3. FIG. 2 shows an embodiment of such a switch matrix, with example size of 8×4. The switch matrix comprises 8 input ports 11 and 4 output ports 12. Each input port is connected to a 1:4 splitter 13, and each output port is connected to an 8:1 combiner 14. Each output of each splitter is connected to a combiner input as shown in FIG. 2 so as to ensure that any input to the switch matrix can be available at any output of the switch matrix. The connections 15 between splitters and combiners comprise single pole single throw switch elements 16 and variable attenuators 17 in series. There are therefore 32 switch elements and 32 variable attenuators in total for this size of matrix even though FIG. 2 schematically illustrates only one switch element and attenuator. The switches can be set to either an "on" state or an "off" state so that any combination of input signals can be routed to any combination of output ports. The variable attenuators can be set to balance the path loss across all paths between input and output.

Figure 3:
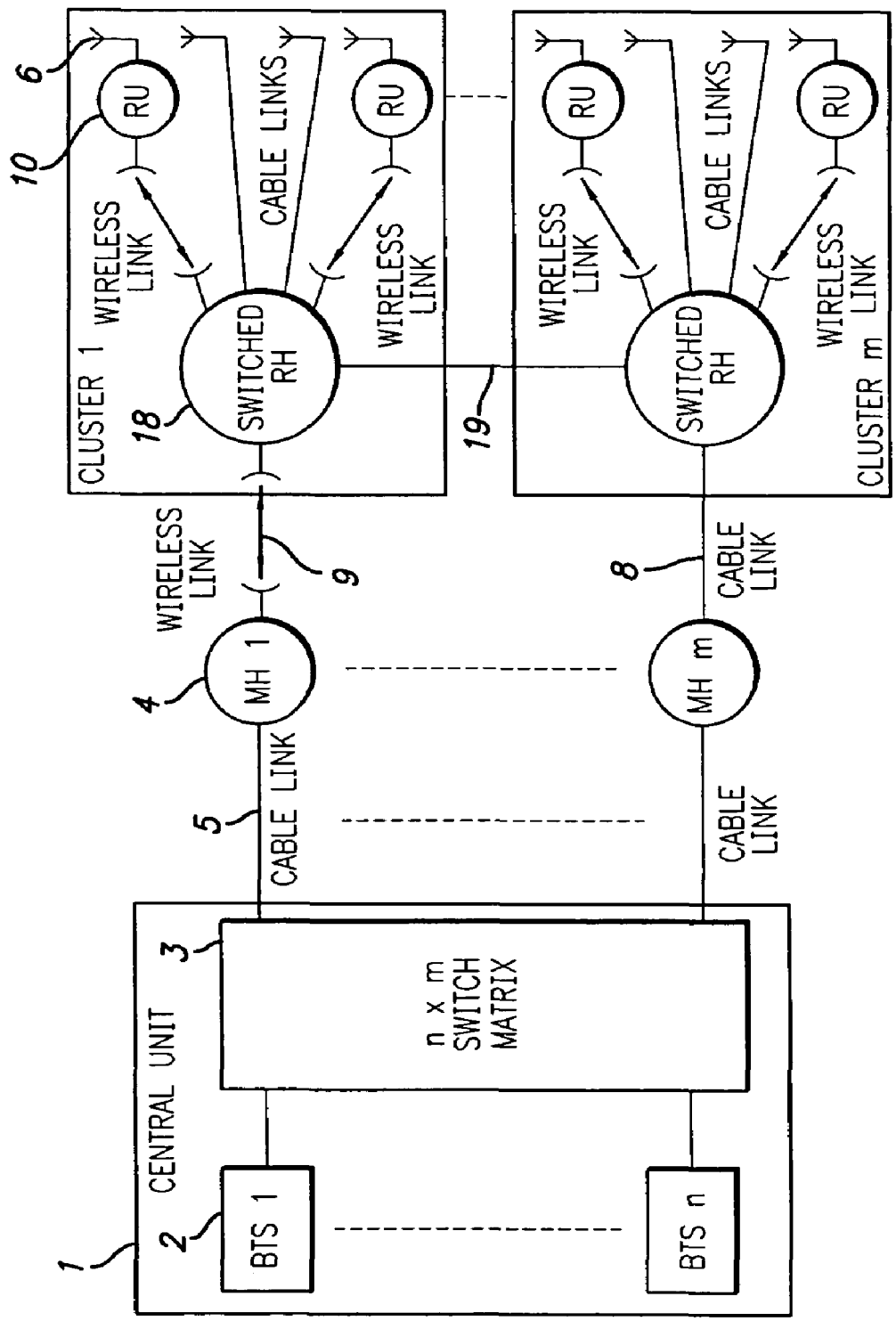
FIG. 3 is a schematic representation of another signal distribution system of the present invention.

FIG. 3 shows another signal distribution system of the present invention. FIG. 3 illustrates many of the same elements of FIG. 1 as indicated by the similar reference numbers. Discussion of these elements will not be repeated. Although FIG. 3 does not illustrate mobile units, the system may include mobile units as in FIG. 1.

In the illustrated system of FIG. 3, some or all of the remote hubs contain switch matrices so that a further level of signal routing can be facilitated. These switched remote hubs 18 enable an architecture that provides finer granularity than the embodiment of FIG. 1, so that each antenna can be individually addressed if required. Radio channels can therefore be routed at the antenna level rather than at the antenna cluster level, which allows greater flexibility in providing service. The switched remote hubs may also be interconnected and controlled by a common control system. The interconnecting links 19 may be either cable or wireless, although a cable link is shown in FIG. 3 by way of example. Interconnecting the switched remote hubs gives greater network resilience. Although FIG. 3 only illustrates one switched remote hub per cluster, the present invention can have more than one switched remote hub per cluster.

Figure 4:
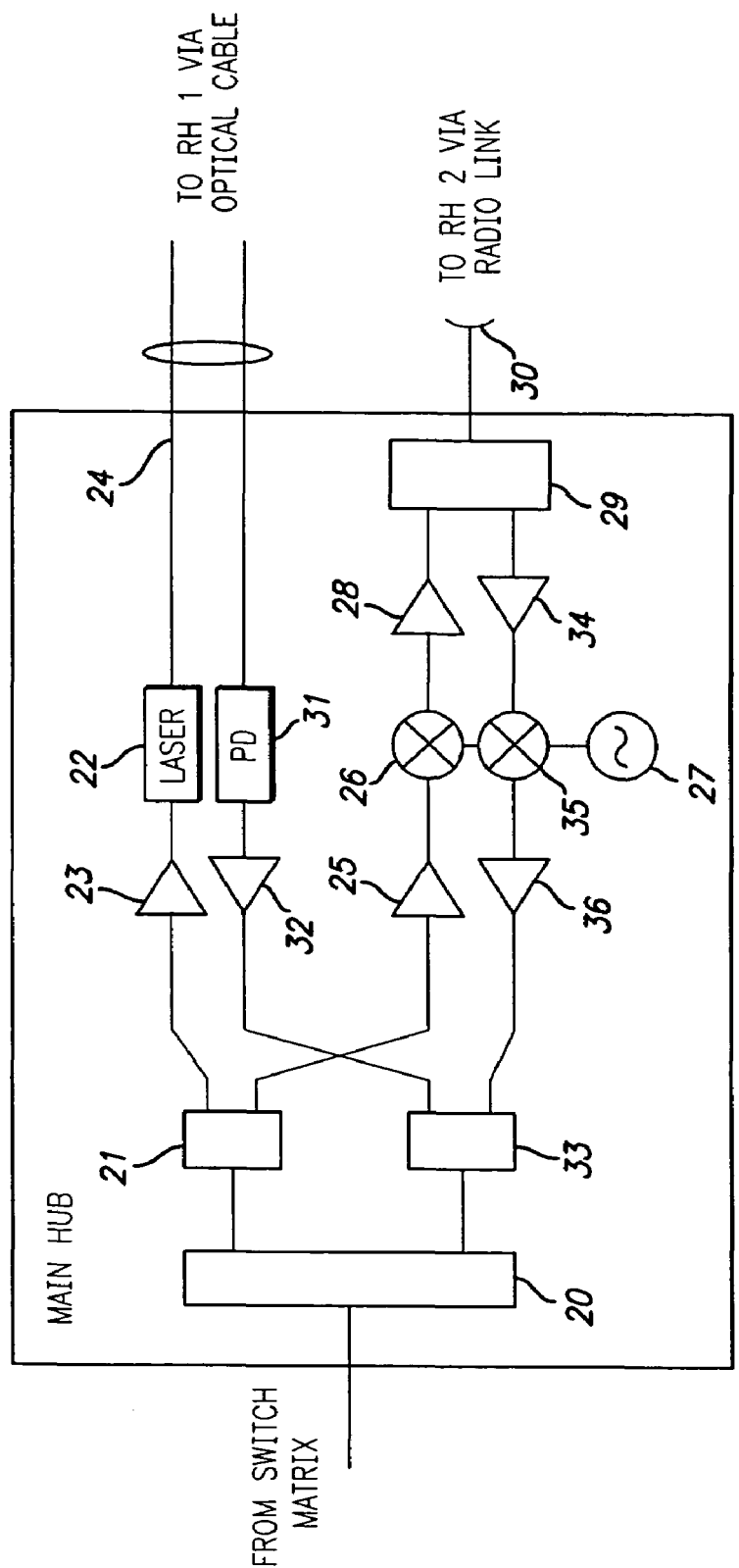
FIG. 4 illustrates a main hub in a signal distribution system of the present invention, such as illustrated in FIG. 1 or 3.

FIG. 4 shows an embodiment of a main hub such as illustrated in FIGS. 1 and 3. In this example, the main hub connects to two remote hubs, one uses optical fiber cable and the other is a wireless link using out-of-band radio. This main hub is constructed as follows. The input signal from the switch matrix is split into forward and reverse transmission directions using a duplexer 20. In the forward direction, the signal is then split two ways using a splitter 21. One of these paths goes to a laser 22 via an amplifier 23. The optical output from the laser is transmitted to the remote hub using optical fiber cable 24.

The other forward path goes to a frequency upconverter, which comprises an input amplifier 25, a mixer 26, a local oscillator 27 and an output amplifier 28. A further duplexer 29 is used at the output port of the radio link in order to combine forward and reverse transmission directions. The output radio signal is radiated using an antenna 30.

In the reverse direction, the signals enter the main hub either via the optical cable or the radio link. In the case of the optical cable, the optical signal is converted back to a radio signal using a photodiode 31, amplified using amplifier 32 and combined with other reverse path signals using a combiner 33. In the case of the radio link, the reverse signal passes through the duplexer 29 and is frequency translated back to the original radio carrier frequency using a downconverter. The downconverter comprises an input amplifier 34, a mixer 35, a local oscillator 27 and an output amplifier 36. The remote hubs in FIGS. 1 and 3 may have a similar construction to the main hub illustrated in FIG. 4.

Features of all hubs in the present invention include: one or more input ports, converters (if necessary) to bring a transmitted signal back to an in-band radio signal, a duplexer to separate forward and reverse transmission directions, splitter/combiners, an amplification of an in-band radio signal, converters (if necessary) to convert a signal to an appropriate transmission medium (e.g., out-of-band radio or FSO) and one or more output ports.

The remote hubs may also be interconnected, again using either cable links or wireless links, to provide additional resilience to the system. The use of interconnecting links between the remote hubs, and the option of having distributed switch matrices in the remote hubs, opens up intriguing possibilities for system management and control. In addition to greater network resilience afforded by such a meshed system, there are opportunities for extending the reach and routing around obstacles in the case of wireless links. The ability to route around obstacles makes the network closer to a line-of-sight radio system, which increases quality of service and reduces cost.

The arrangement and architecture of the present invention described here constitutes a distributed antenna system for providing capacity and coverage for an outdoor wireless communications network. Features of the present invention include: the use of a switch matrix, which allows coverage and capacity to be allocated dynamically (thereby saving capital and operating costs compared to traditional DAS architectures); the selective use of wireless links between the base stations and the antennas (thereby providing a cost-effective transmission solution in cases where cable availability is non-existent or impractical); an architecture that incorporates distributed switching within remote hubs to provide fine granularity in allocating services to antennas; and an interconnected wireless network topology that provides resilience to failure, routing around obstacles and an extended reach.

The combination of such features provides a signal distribution system and architecture that is attractive to wireless network operators due to the cost savings and operational flexibility compared to deployments based on prior art systems.

Although the present invention has been described as a communications system, the present invention discussed above can be performed as a communications method or methods. While a method will be described as transmitting signals from the one or more base stations to one or more distributed antennas, it is to be understood that the method can be performed in reverse from one or more distributed antennas to one or more base stations.

The communications method can comprise transmitting signals from a plurality of base stations to a switch matrix. As illustrated in FIG. 1, the base station 2 is connected to a switch matrix 3 for transmitting and receiving signals therebetween. A plurality of base stations can thus transmit signals to the switch matrix.

The method can further comprise routing the signals by the switch matrix as, for example, illustrated in FIG. 2. The method can further comprise transmitting the routed signals to a plurality of distributed antennas via communication links. The communication links can be wireless, cable or a combination of wireless and cable.

The communications method can further comprise transmitting the routed signals to a hub, such as main hub 4 in FIG. 1, and then transmitting those routed signals from the hub to the plurality of distributed antennas. If the distributed antennas are in clusters, the communications method may comprise transmitting those routed signals from the hub to only one cluster. FIG. 1 illustrates an example of this procedure. Main hub 4 only transmits the routed signals that it receives to cluster 1. Cluster 1 is a subset of all the distributed antennas in the system.

The communications method can further comprise sending routed signals from the hub to a remote hub and having the remote hub transmit the signals to the cluster of distributed antennas or some smaller group of distributed antennas in that cluster. For example, in FIG. 1, the main hub 4 transmits at least some of the routed signals that it receives to remote hub 7 which, in turns, sends the signals to certain distributed antennas in the cluster.

The communications method can further comprise routing signals by a switch matrix in the remote hub to the distributed antennas in the cluster or some smaller group of distributed antennas in the cluster. For example, FIG. 3 shows a remote hub 18 having a switch matrix for such routing.

The communications method can further comprise transmitting signals by more than one remote hub to the distributed antennas in the cluster. As shown in FIG. 1, for example, two remote hubs send signals to different groups of distributed antennas in the cluster. It should be noted that a distributed antenna can simply be an antenna (as in 6a of FIG. 1) or comprise a remote unit with an antenna (as in 10 and 6 in FIG. 1). The communications method can further comprise connecting the remote units in a cluster. For example, as illustrated in FIG. 1, remote units in cluster 1 are connected by connection 8 emanating from remote unit 7. The communications method is not limited to connecting remote units in a cluster. Remote units from different clusters can be connected as illustrated in FIG. 3.

Although the present invention has been fully described in connection with the embodiments thereof and with reference to the accompanying drawings, it is to be noted that various changes and modifications will become apparent to those skilled in the art. Such changes and modifications are to be understood as being included within the scope of the present invention as defined by the claims.

What is claimed is:
1. A communications system comprising:
 a plurality of base stations transmitting signals;
 a plurality of distributed antennas in communication with mobile devices;

a switch matrix in operation with the plurality of base stations to route the signals to the plurality of distributed antennas;

a plurality of remote hubs;

a plurality of main hubs between the switch matrix and the plurality of remote hubs for routing the signals to the plurality of remote hubs, the plurality of remote hubs, which are remote from the plurality of main hubs and between the plurality of main hubs and the plurality of distributed antennas, for routing the signals to the plurality of distributed antennas; and at least one wireless link between at least one of the main hubs and at least one of the remote hubs.

2. The communications system of claim 1 further comprising:

at least one wireless link between the at least one of the remote hubs and at least one of the distributed antennas.

3. The communications system of claim 1 wherein the plurality of distributed antennas are arranged in a plurality of clusters and each remote hub transmits routed signals to an associated cluster of distributed antennas, a different cluster of distributed antennas is associated with each remote hub.

4. The communications system of claim 3, wherein at least one antenna in the cluster of distributed antennas comprises a remote unit with an antenna.

5. The communications system of claim 3 wherein at least one of the remote hubs comprises a switch matrix to route signals from at least one of the main hubs to a group of distributed antennas in the associated cluster of distributed antennas.

6. The communications system of claim 1, further comprising:

a control system, wherein each of the remote hubs comprises a switch matrix controlled by the control system.

7. The communications system of claim 1 wherein the at least one wireless link transmits routed signals at a radio carrier frequency band of at least one of the plurality of base stations.

8. The communications system of claim 1 wherein the at least one wireless link transmits routed signals at a radio carrier frequency band different from a radio carrier frequency band of at least one of the plurality of base stations.

9. The communications system of claim 1 wherein the at least one wireless link comprises a free space optical link that transmits routed signals at an optical frequency.

10. The communications system of claim 1 further comprising:

at least one wireless link between at least one of the remote hubs and at least one of the distributed antennas.

11. A communications method comprising:

transmitting signals from a plurality of base stations to a switch matrix; and routing the signals by the switch matrix to a plurality of distributed antennas via a plurality of main hubs and a plurality of remote hubs, the plurality of main hubs are between the switch matrix and the plurality of remote hubs for routing the signals to the plurality of remote hubs, the plurality of remote hubs, which are remote from the plurality of main hubs and between the plurality of main hubs and the plurality of distributed antennas, for routing the signals to the plurality of distributed antennas, the routing uses at least one wireless link between at least one of the main hubs and at least one of the remote hubs.

12. The communications method of claim 11 wherein the signals are routed to the plurality of main hubs, from the plurality of main hubs to the plurality of remote hubs, and from the plurality of remote hubs to the plurality of distributed antennas.

13. The communications method of claim 12 wherein the signals are routed from each remote hub to an associated cluster of distributed antennas of the plurality of antennas, a different cluster of distributed antennas is associated with each remote hub.

14. The communications method of claim 13 wherein at least one of the remote hubs uses a switch matrix to route signals to its associated cluster of distributed antennas.

15. The communications method of claim 11, wherein:

the signals are routed from a first remote hub to a second remote hub, and from the second remote hub to a cluster of distributed antennas of the plurality of distributed antennas which is associated with the second remote hub.

16. A communications system, comprising:

a plurality of base stations;

first, second and third distributed antennas in communication with mobile devices;

a first hub in communication with the first and second distributed antennas via respective wireless links;

a switch matrix for routing signals from the plurality of base stations to the first and second distributed antennas via the first hub;

a second hub in communication with the first hub via a respective wireless link, the second hub is between the first hub and the switch matrix; and a third hub in communication with the third distributed antenna via a respective wireless link, the second hub also in communication with the third hub via a respective wireless link, the second hub is between the third hub and the switch matrix.

17. The communications system of claim 16, wherein:

the switch matrix routes signals from the plurality of base stations to the first and second distributed antennas via the second and first hubs, and to the third distributed antenna via the second and third hubs.

18. The communications system of claim 3, wherein:

the switch matrix is controllable to change which signals from which base stations go to which clusters of distributed antennas.

19. The communications system of claim 18, further comprising:

at least one wireless link between at least one of the remote hubs and at least one of the distributed antennas.

20. The communications system of claim 19, wherein:

the remote hubs perform distributed switching of the signals.

21. The communications system of claim 1, wherein:

the switch matrix has n input ports and m output ports, and is controllable to make any input to an input port available at any output port.

22. The communications system of claim 21, wherein:

the switch matrix is controllable to route any combination of input signals to any combination of output ports.

23. The communications system of claim 1, wherein:

the switch matrix is controllable to move network capacity from over-utilized coverage areas to under-utilized coverage areas.

24. The communications system of claim 5, wherein:

the switch matrix of the at least one of the remote hubs allows the at least one of the remote hubs to address an individual antenna in the associated cluster of distributed antennas.

25. The communications method of claim 11, further comprising:

controlling the switch matrix to move network capacity from over-utilized coverage areas to under-utilized coverage areas.

26. The communications method of claim 13, further comprising:

controlling the switch matrix to change which signals from which base stations go to which clusters of distributed antennas.

* * * * *